United States Patent [19]

Hornyak, Jr. et al.

[11] 4,227,909
[45] Oct. 14, 1980

[54] ELECTRIC FOREHEARTH AND METHOD OF MELTING THEREIN

[75] Inventors: Emery J. Hornyak, Jr., Temperance, Mich.; Philip D. Perry, Toledo, Ohio; James E. Sherman, Temperance, Mich.

[73] Assignee: Owens-Illinois, Inc., Toledo, Ohio

[21] Appl. No.: 47,677

[22] Filed: Jun. 12, 1979

[51] Int. Cl.² .............................................. C03B 5/02
[52] U.S. Cl. ....................................... 65/135; 65/136; 65/337
[58] Field of Search ................. 65/134, 135, 136, 337; 13/6

[56] References Cited

U.S. PATENT DOCUMENTS

| | | | |
|---|---|---|---|
| 1,905,533 | 4/1933 | Wadman | 13/6 |
| 1,928,288 | 9/1933 | Henry | 65/129 |
| 2,545,619 | 3/1951 | Lambert | 13/6 |
| 3,506,769 | 4/1970 | Gell | 13/6 |
| 3,530,221 | 9/1970 | Penberthy | 64/337 UX |
| 4,029,488 | 6/1977 | Rhett | 65/136 |
| 4,118,215 | 10/1978 | Brax | 65/134 |

*Primary Examiner*—Arthur D. Kellogg
*Attorney, Agent, or Firm*—D. T. Innis; M. E. Click; D. H. Wilson

[57] ABSTRACT

Disclosed is a method and apparatus for preventing the formation of blisters in an electrically-heated forehearth that utilizes submerged electrodes connected to either a single or plural phase alternating current source. The electrodes are arranged so that Joule effect heating is effected by passing alternating current through the molten glass with the center tap of the secondary of the power transformer being connected to the positive side of a Direct Current source through a filter, while the negative side of the DC source is connected to a counter electrode, immersed in the glass at a point upstream of the forehearth.

With this physical arrangement, the formation of blisters due to free electrons migrating to and collecting on some of the electrodes that are at different potentials than the others is prevented. This is accomplished by the fact that all of the forehearth electrodes are maintained at the same potential and the counter electrode is at a different potential so that these free electrons will collect at the single counter electrode and create bubbles or blisters at a position well in advance of the forehearth. With this system, the blisters will disappear before reaching the forehearth. The forehearth electrodes are disclosed as being formed of stainless steel with molybdenum tips and the electrode support being electrically isolated from the forehearth structure.

12 Claims, 6 Drawing Figures

ELECTRIC FOREHEARTH AND METHOD OF MELTING THEREIN

BACKGROUND OF THE INVENTION

In the conditioning and controlling of the temperature of molten glass flowing through a forehearth, several heating systems have been used in the past. It should be recognized that one of the important aspects of the ability to form glass articles is to provide glass to the forming machines with the glass at its best forming viscosity. With this in mind, it has been the practice in the past to melt the ingredients that form the glass in a relatively large tank termed a "melter" or "furnace" and then, in order to ensure the complete melting of all of the ingredients and to ensure complete chemical reaction to have taken place, the glass in the melter is usually fed to a chamber which is termed a "refiner". The interconnection between the furnace and the refiner is usually by way of a submerged channel. In this manner, unmelted light materials are prevented from passing into the refiner. Furthermore, reactions taking place within the glass during the melting may produce gaseous inclusions within the glass, which inclusions, if carried forward into the glass used to produce articles, might result in glass articles having defects. In the refiner, the glass is held at an elevated temperature for a period of time which is normally sufficient to permit the gaseous inclusions to expand and move upwardly to the surface of the glass. Glass from the refiner is then fed through an enclosed channel, termed a "forehearth", to the position where its extreme end will be overlying the location of forming machines such as the well-known IS machine for forming glass containers. Essentially, the forehearth serves as a glass conditioning channel through which the glass must flow and permits or provides the opportunity to control the temperature of the glass during its movement therethrough such that when the glass arrives at the remote end thereof, it will be in the condition most desirable for forming glass containers. The remote end of the forehearth is termed the "feeder" and in the case of glass container manufacturing, the feeder will deliver changes of glass termed "gobs" to a plurality of forming machine sections.

It has been the practice in the past that the forehearth temperature was controlled by the use of gas burners or fuel burners positioned along the side of the channel with the flames from the burners supplying heat to the surface of the glass in the forehearth. In conjunction with the burners, stirrers positioned within the glass would provide a system for raising the lower glass up to the surface and pushing the surface glass downwardly into the forehearth channel. All of these various systems were provided in an attempt to optimize the temperature distribution throughout the height and width of the forehearth channel. It should be understood that, in essence, the forehearth is cooling the glass at a controlled rate and that the temperature of the glass in the forehearth will be less than that found in the melter or refiner.

Most recently, the application of heat to the glass as it flows through the forehearth has been carried out by the use of electrodes extending into the glass to which current is supplied to effect heating of the glass by the well-known Joule effect.

An example of such an arrangement is disclosed in U.S. Pat. No. 4,029,488 in which the temperature of the glass is adjusted in the forehearth by providing four zones of influence to which energy is supplied through the use of immersed electrodes positioned along the side walls of the forehearth. As stated in this patent, the glass stream is subjected only to a mild Joule effect, below-surface, heating applied in a controlled manner to accomplish temperature normalization and homogeneity throughout the stream whereupon the glass is delivered to the discharge orifice at a specified temperature.

A similar system to that disclosed in the above-mentioned U.S. Pat. No. 4,029,488, is shown and described in U.S. Pat. No. 1,928,288 to Henry, wherein a system for controlling the temperature within the forehearth is used by controlling the current flow between cross-channel electrodes. Thermocouples are used to sense the temperature of the glass in three zones whereby each zone can be separately controlled in accordance with the temperature measured. In this latter patent, the temperature control is effected just prior to entry of the glass into the feeder and the two locations immediately adjacent to the feeder.

A similar configuration to that disclosed in the Henry U.S. Pat. No. 1,928,288, is the U.S. Pat. No. to Wadman, 1,905,533 which discloses the arrangement of a series of electrodes positioned along the two sides of a forehearth channel and, as shown in FIG. 4, this arrangement is generally the full length of the forehearth. In the configuration of this patent, however, the electrodes themselves are immersed in a secondary liquid rather than in the actual molten glass that flows within a centrally positioned forehearth channel extending between and, in effect, immersed within the liquid which is heated by the electrodes. The liquid which extends around and between the electrodes is a glass which acts as a resistor. Control of the temperature within the forehearth channel in Wadman is accomplished by the selection of the amount of current being fed between opposed electrodes immersed in the glass which surrounds the forehearth channel.

A further patent of interest is that of Gell U.S. Pat. No. 3,506,769, in which a forehearth channel is provided with three-phase current through sets of opposed electrodes extending through the walls of the forehearth adjacent the bottom thereof. In addition to the use of electric heat to supply heat below the surface of the glass in the forehearth, other heat exchange means are shown as being provided above the surface of the glass. These are characterized as being fuel-fed-burners. Thus this patent shows the combination of electric heating and fuel heating.

The present application is concerned primarily with controlling the temperature in the forehearth by use of electricity entirely and the prevention of seeds and blisters in the glass caused by ions attacking the electrodes.

SUMMARY OF THE INVENTION

This invention relates to apparatus for manufacturing molten glass without blisters, wherein a melter, refiner and forehearth combination is used with a plurality of Joule effect heating electrodes positioned in the forehearth to which are connected a source of alternating current. An additional electrode is located in the glass well in advance of the forehearth so as to permit any blisters which may be formed adjacent the furnace electrode to be fully refined before the glass reaches the forehearth. This electrode is connected to the negative side of a source of DC voltage with the positive side of the DC voltage being connected through a filter to an electrically balanced center point of the transformer secondary supplying the AC current to the electrodes in the forehearth. The forehearth electrodes are formed with molybdenum tips and the supporting steel rod is electrically isolated from the forehearth wall by inter- positioning of a high resistivity tube about the rod.

DETAILED DESCRIPTION OF THE DRAWINGS

Figure 1:
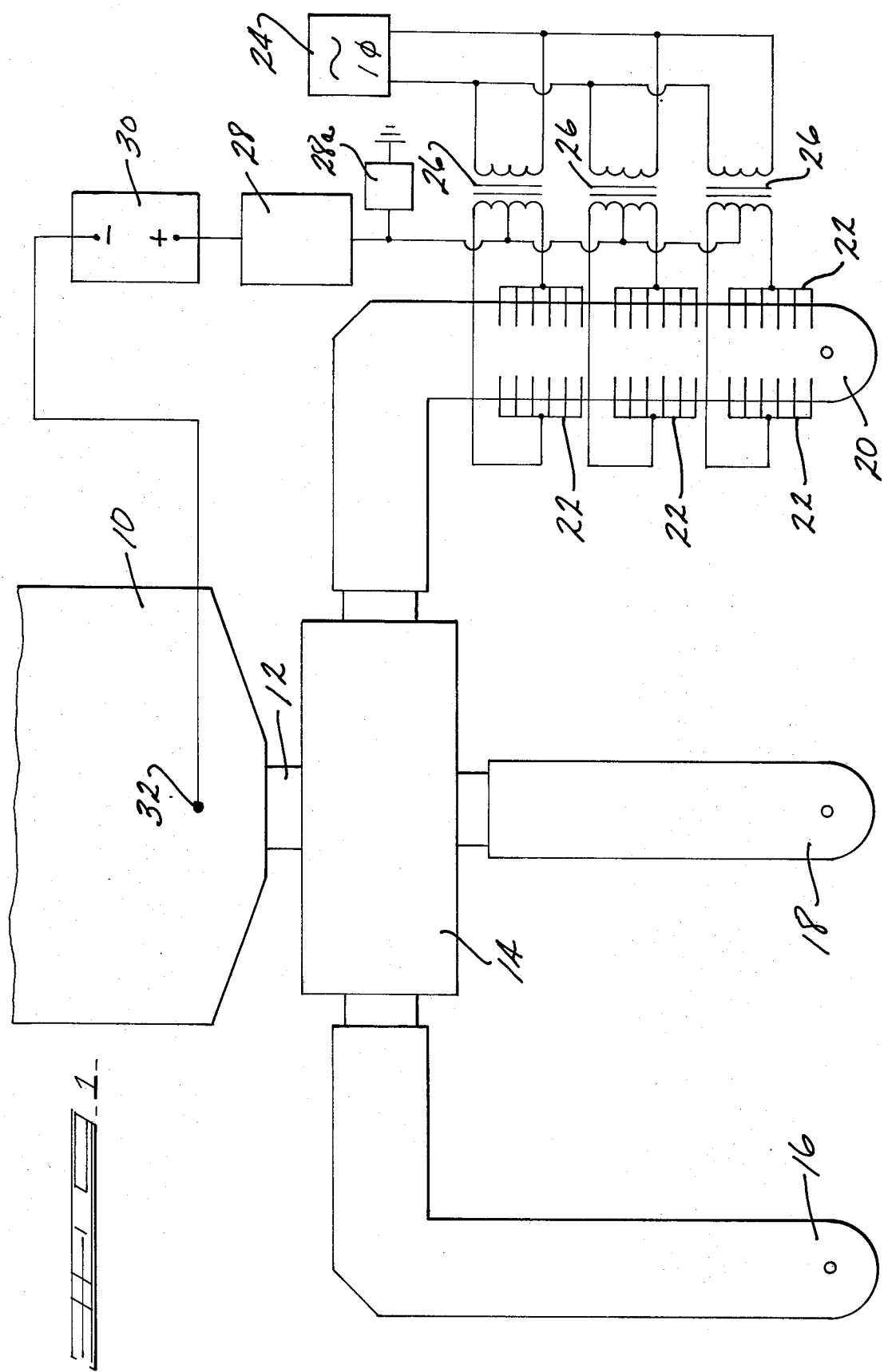
FIG. 1 is a schematic plan view of a glass melting furnace, refiner and forehearth with the circuit arrangement of the invention, wherein the power supply for the electrodes is a single phase alternating current.
Figure 2:
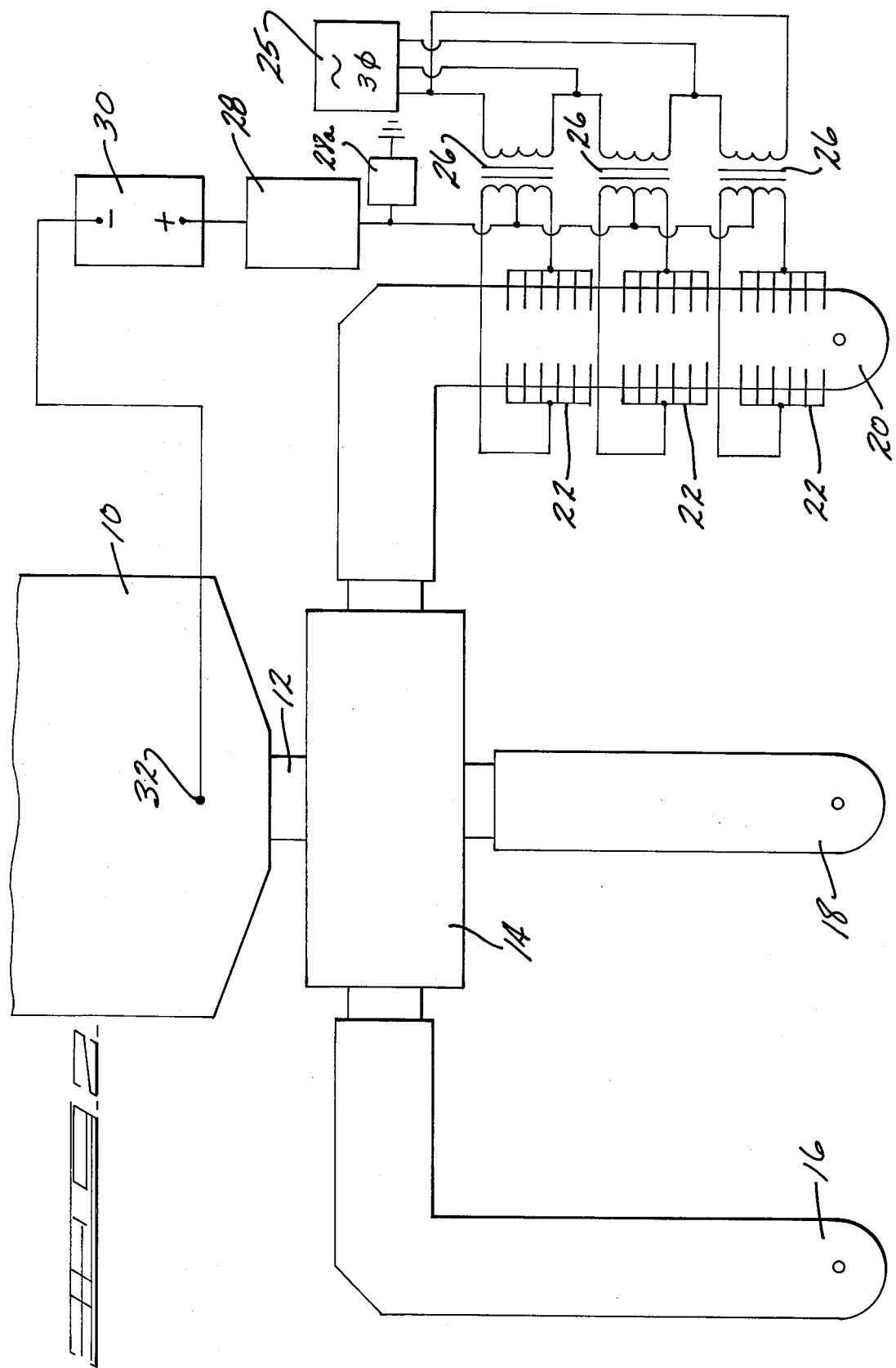
FIG. 2 is a view similar to FIG. 1 showing the connection of a three-phase power supply to the electrodes in a forehearth.

Referring to FIG. 1, a melter 10 includes a throat section 12 which is connected to a refiner 14. The melter 10 is designed to receive glass batch or glass forming material and, in essence, melt the batch into a liquid state. The refiner 14, which receives the completely molten glass, is shown as being connected to feed three forehearths 16, 18 and 20. For purposes of brevity, only the operation of the forehearth 20 will be described in any detail. The forehearths 16 and 18 operate in a fashion identical to the forehearth 20 and will also be supplied with heating electrodes. A plurality of Joule effect electrodes 22 which, in the preferred embodiment of the invention, are made of molybdenum, are located in the forehearth 20 in such a way that they are totally submerged in molten glass which is contained in the forehearth 20. Depending upon the size, length and shape of the forehearth, any desired number of electrodes may be utilized. The electrodes 22 are connected to an AC power source 24 through one or more power transformers 26. The AC power source 24 may be single phase, as shown in FIG. 1, or it may be a three-phase source 25, as shown in FIG. 2. An AC signal is thus provided to the electrodes 22 which causes current to pass through the molten glass which is contained in the forehearth 20, thereby causing heating of the glass by the well-known Joule effect.

The nature of molybdenum which is used to make the heating electrodes 22 is such that, in glasses which use sulfate refining agents, an electrochemical reaction occurs at the electrodes 22, forming gaseous inclusions referred to as blisters in the glass. It is believed that the reactions which produce the blisters are caused by the willingness of the molybdenum to give up free electrons to the sulfate ions which are present in the molten glass.

In order to negate the effects of electro-chemical reactions, an additional counter electrode 32 is located, submerged in the molten glass, in the melter 10 adjacent to the throat section 12. The electrode 32 is connected to the negative pole of a conventional DC power supply 30. The positive pole of the DC power supply 30 is connected through a filter 28 to the electrical centers of the transformers 26. An isolating filter 28a is connected between ground and the electrical center of the transformer. The filter 28, which is a conventional filter, serves a function of preventing any AC signals from harming the DC power supply 30. The connection of the DC power supply 30 to the transformer 26 causes a positive and equal DC potential to be impressed upon the electrodes 22 with respect to the melter electrode 32. This prevents any DC current from passing between any of the electrodes 22. The connection of the DC power supply to the melter electrode 32 and to the heating electrodes 22 creates a DC circuit and causes free electrons at the electrodes 22 to flow through the DC circuit onto the electrode 32. The abundance of free electrons at the melter electrode 32 will cause the blister-causing electro-chemical reaction to occur at this location rather than at the heating electrodes 22 in the forehearth 20. Blisters formed at this point will not result in deterioration of the quality of the molten glass which ultimately leaves the forehearth 20, since they are created at a point in the melting process which permits sufficient time for them to be refined out of the molten glass before it leaves the forehearth 20. Although the electrode 32 is shown located in the melter adjacent to the throat section 12, its positioning is not critical. All that is required is that the electrode 32 be located far enough back in the melting process to permit any blisters which are formed to be refined out of the molten glass before it is extracted from the forehearth 20. This is a function of the distance of the electrode 32 from the point of extraction of the molten glass, as well as the velocity or throughput of the molten glass as it moves through the system.

With respect to the DC voltages which are impressed upon the electrodes in the other forehearths 16, 18 either the DC power supply 30 or separate power supplies may be employed. In this regard, some care must be taken to avoid DC currents from being set up between electrodes in the forehearths 16, 18 and 20 respectively. In any event, these currents would be minimal and the critical factor is that within a particular forehearth each electrode is kept at an equal DC potential with respect to all other electrodes in that forehearth.

Figure 3:
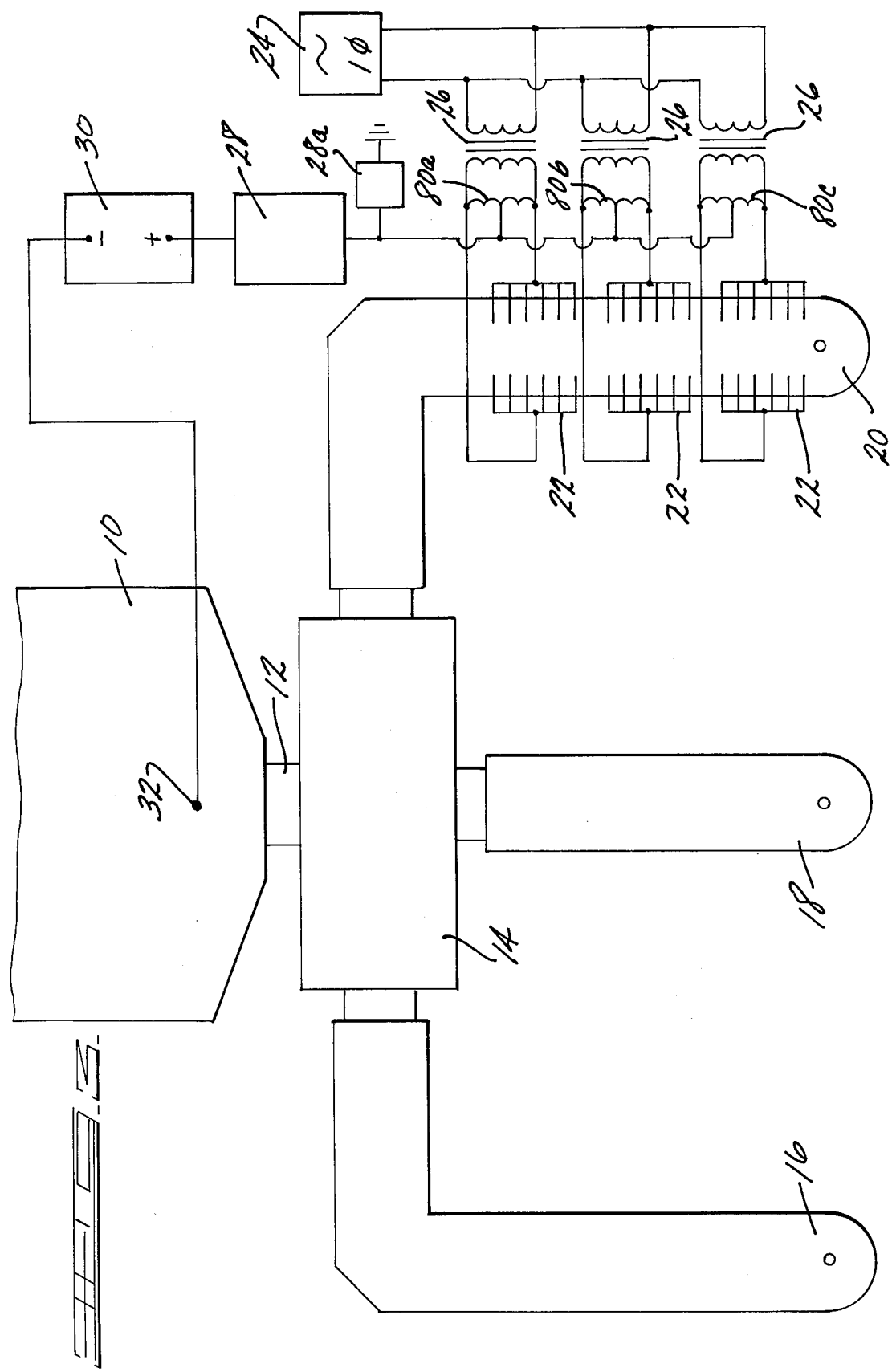
FIG. 3 is a schematic plan view similar to FIG. 1 showing the use of an autotransformer to obtain an elecrically balanced centerpoint for a positive connection to the electrodes in the forehearth.

Turning now to FIG. 3, there is shown a circuit connection which is helpful in those situations where existing power transformers are not provided with center taps on the secondary and, therefore, making it difficult to actually locate the electrical center of the secondary. By providing an autotransformer connection to the secondary, an electrical center or floating neutral is available for connecting to the DC source. The autotransformer windings are shown in FIG. 3 at 80a, 80b and 80c. The reference numerals from the FIG. 1 embodiment are carried through in this embodiment where the parts are essentially the same.

Figure 4:
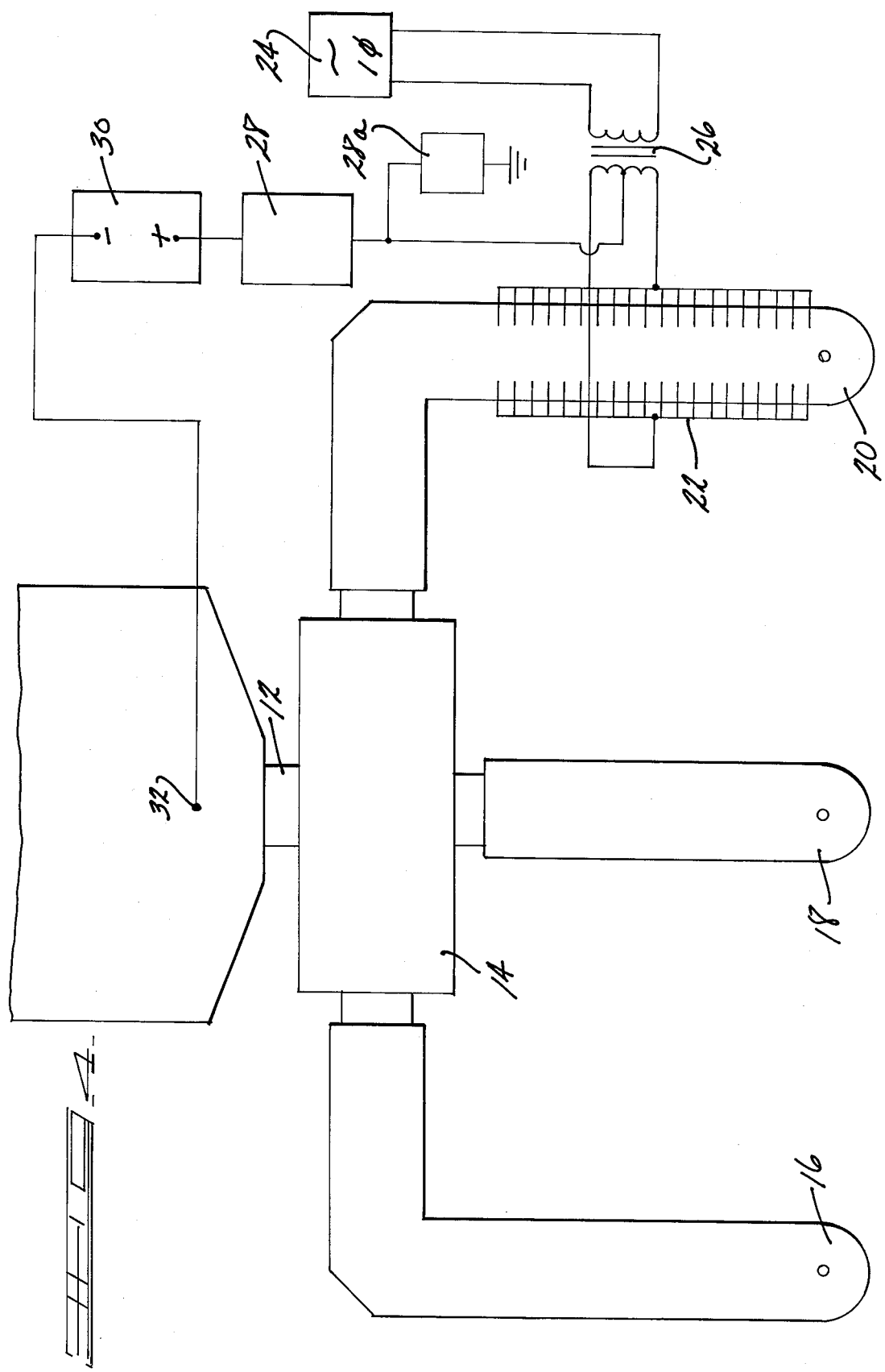
FIG. 4 is a schematic plan view similar to FIG. 3 showing a single zone electrode system in a forehearth.

With specific reference to FIG. 4, there is shown a schematic, electrical connection to the electrodes, positioned in a forehearth, which is an alternative to that previously described with respect to FIG. 3. In this embodiment, it will be noted that the electrodes 22 at each side are all connected together and are supplied from a single transformer 26; thus the electrodes are connected to a single phase alternating current source 24. It has been found that a single zone electrode connection in the forehearth is feasible and, with proper selection of current, it is adequate to provide sufficient heating current to electrodes in the forehearth. Again, the electrodes 22 are connected through an autotransformer winding 80 to a filter 28 which in turn is connected to a DC source 30. It should be noted that a ground connection is provided between the filter 28a and transformer 26 in the same manner as disclosed with respect to the embodiments of FIGS. 1–3. Again, as in the previous embodiments, the negative pole of the DC supply is applied to an electrode 32 positioned in the melter 10.

Figure 6:
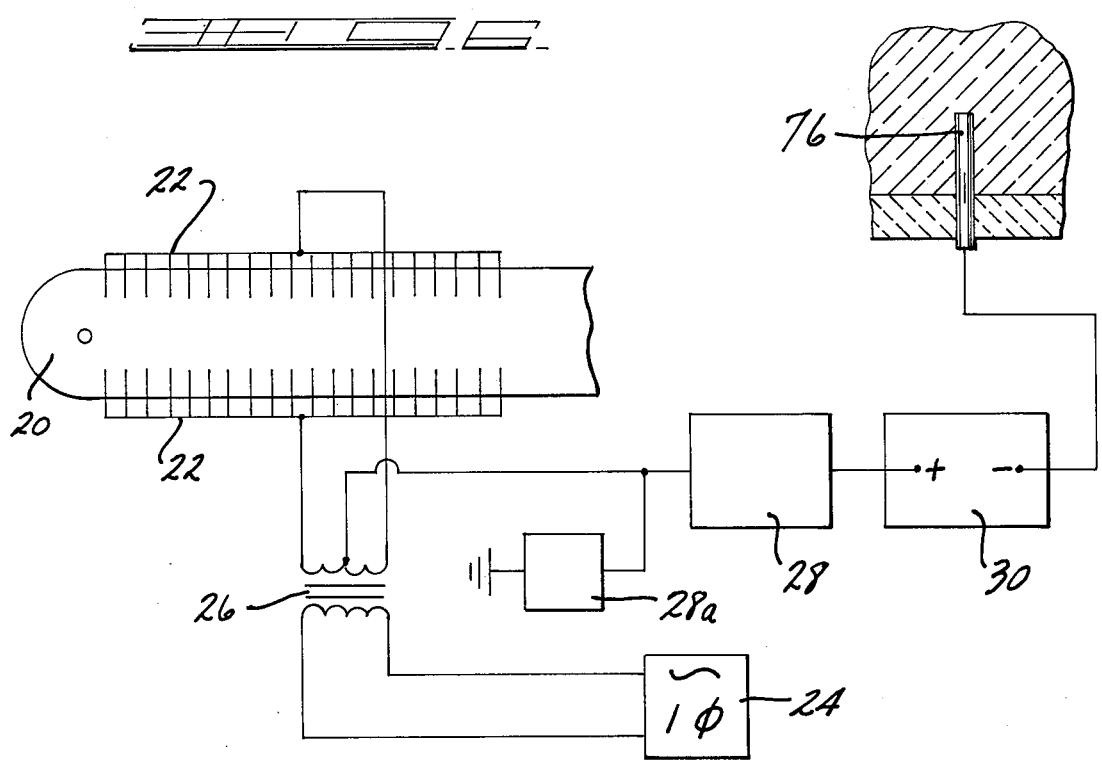
FIG. 6 is a schematic plan view of a forehearth with a single zone electrode system connected to a floating AC supply and isolated DC supply connected to a melter electrode.

FIG. 6 shows a still further embodiment in which a single zone electrode setup is illustrated, with it being understood that the forehearth 20 (only a portion of which is shown) is of similar construction as that illustrated in the previous embodiments, in that electrodes 22 are connected to a transformer 26. The center tap of transformer 26 is connected to a filter 28 which in turn is connected to a DC supply 30, as shown. In addition, the center tap of transformer 26 is connected through a second filter 28a to ground. DC source 30 is connected to a schematically shown melter electrode 76. With the particular circuit shown, it will be noted that the alternating current is, in a sense, floating while the DC circuit is connected to ground at the electrodes. The melter electrode 76 may, in fact, be an electrode which is used for electric melting in the melter. It is only necessary that filter 28 be bigger than the voltage to ground from 76.

Figure 5:
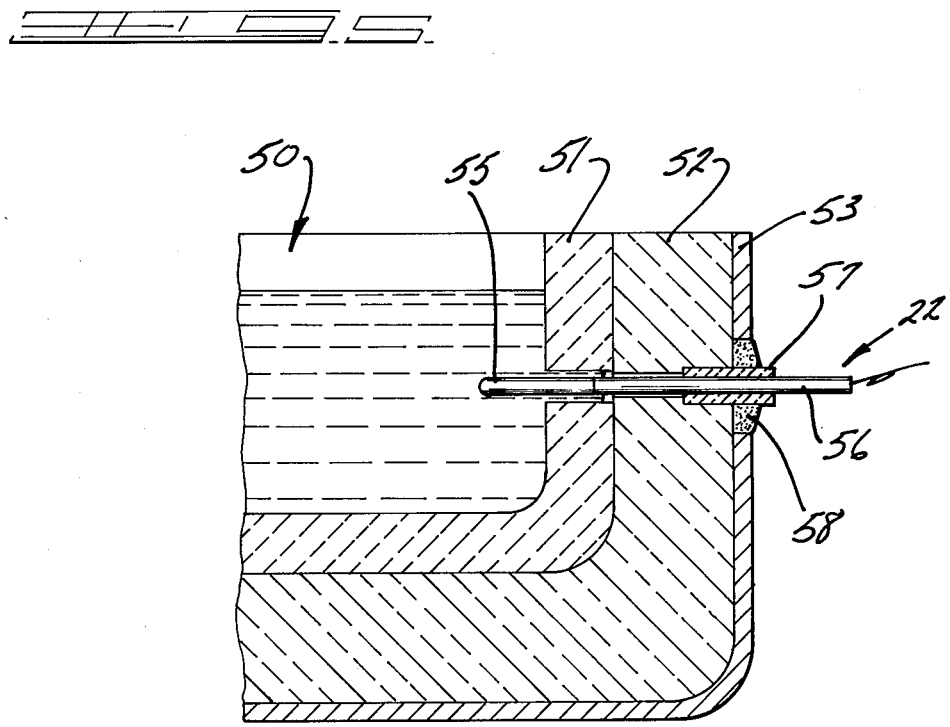
FIG. 5 is a vertical, cross-sectional view taken through a forehearth at one of the electrode positions.

A specific example of the physical arrangement and positioning of an electrode within the forehearth is illustrated in FIG. 5 in which a forehearth channel, generally designated 50, is provided in a refractory material 51 formed in the shape of a generaly elongated, trough-like, structure. The refractory forehearth is in turn enclosed by an insulating fire brick structure 52, with the fire brick structure supported by a metal shell 53. Electrodes are positioned so that they extend through the metal structure 53, the insulating fire brick 52 and the refractory wall 51. The electrode, generally designated 22, is comprised of a tip 55 which may be made of a conductive, molten glass resistant material such as molybdenum. The tip 55 in turn is connected to a stainless steel rod 56. It should be noted that the rod 56 extends beyond the metal wall 53 and at the area where the rod goes through the wall 53, a high-resistance tube 57 surrounds the electrode 56. This tube 57 may be formed of a borosilicate glass. The borosilicate glass tube is fixed in its position by the use of mortar 58. An example of such a mortar may be Sauereisen No. 8 Zircon Cement. It can readily be seen that the electrode 22 will be positioned such that its tip 55 will extend into the forehearth and as a particular example, may extend into the forehearth for about 4 inches. The borosilicate glass which is used as a high-resistance material assures that there will be electrode isolation and will have a resistivity in the order of $10 \times 10^9$ ohm cm.

In summary, the present invention comprises a melter, a refiner connected to the melter, and one or more forehearths connected to and fed by the refiner. Each forehearth contains a plurality of Joule effect heating electrodes and an AC power source for supplying AC power to the electrodes. Means are included for impressing a positive and equal DC voltage on each electrode located in the forehearth and a negative DC voltage on an additional electrode which is located in the melter adjacent its connection to the refiner. The negative potential of the electrode in the refiner with respect to the electrodes in the forehearth provides a path for electron flowback from the forehearth electrodes through the refiner to the electrode in the melter. This prevents the blister forming electro-chemical reaction from occurring in the forehearth area. Any blisters which are produced are done so on the electrode in the melter due to the collection of free electrons at that point. The production of blisters at this location permits them to be refined out of the molten glass before it is removed from the forehearth.

In addition, it should be understood that by providing electrode isolation, stray current leakages which might occur where care is not taken is prevented. If not prevented, leakage could upset the benefits of the present invention. Thus, it is significant in the present invention that the electrodes be electrically isolated as much as is feasible from any stray currents that might be flowing in the surrounding support structure.

We claim:

1. Apparatus for manufacturing molten glass without blisters comprising, in combination:
   a melter for melting a glass batch;
   a refiner connected to receive molten glass from said melter;
   one or more forehearths connected to and fed by said refiner;
   a plurality of Joule effect heating electrodes located in at least one forehearth;
   AC means connected to said heating electrodes for providing an AC current to said heating electrodes;
   DC means, connected to said AC means, for impressing a positive and equal DC signal upon each of said heating electrodes; and
   an electrode, located in said melter adjacent the connection to the refiner and connected to the opposite pole of said DC means, for providing a path for electron flow from all of said heating electrodes to said melter electrode.

2. The apparatus of claim 1 wherein said heating electrodes are made of molybdenum.

3. The apparatus of claim 1 wherein said forehearth is formed of a molten glass resistant refractory material in contact with the glass, an insulating fire brick structure surrounding the sides and bottom of said forehearth, and metal-supporting means surrounding the fire brick structure.

4. The apparatus of claim 1 wherein said heating electrodes comprise an elongated rod, said rod being formed with a molybdenum end portion which extends into the molten glass, and a stainless steel major porton, the end of said rod opposite said molybdenum portion extending through the wall of the forehearth, and means for surrounding said rod for electrically isolating the rod from stray currents in the wall of the forehearth support structure.

5. The apparatus of claim 4, wherein said means surrounding the rod is a borosilicate glass tube, and means for securing the tube in an opening in the forehearth supporting structure.

6. The apparatus of claim 1 wherein said AC means includes an AC power source connected to one or more power transformers, said transformers being connected to said heating electrodes.

7. The apparatus of claim 6 wherein said DC means includes a DC power supply whose positive pole is connected to the electrical centers of the secondary of each power transformer and whose negative pole is connected to said furnace electrode.

8. The apparatus of claim 7 wherein said DC means includes a filter connected between the DC power supply and the transformers for preventing any AC components from reaching the DC power supply.

9. The apparatus of claim 7 wherein said DC means includes a filter through which the electrodes are grounded.

10. The apparatus of claim 6 wherein said AC power source is single phase.

11. The apparatus of claim 6 wherein said AC power source is three phase.

12. In a method of manufacturing molten glass by means of an apparatus which includes a melter for melting a glass batch, a refiner connected to receive molten glass from the furnace, one or more forehearths connected to and fed by the refiner, and a plurality of Joule effect heating electrodes located in each forehearth wherein an AC signal is provided to said heating electrodes to cause Joule effect heating of molten glass to occur, the improvement comprising the steps of:

impressing a positive and equal DC voltage upon each heating electrode; and impressing a negative DC voltage upon an electrode which is located in said melter adjacent to the connection to said refiner so as to provide a path for the flow of electrons from the heating electrodes to said furnace electrode and thereby cause free electrons to be collected on said melter electrode and prevent the formation of blisters on the heating electrodes.

* * * * *